3,028,256
METHOD FOR FORMING A COATING OF MOLYBDENUM CARBIDE ON A CARBON BODY
Massoud T. Simnad, La Jolla, Calif., assignor, by mesne assignments, to the United States of America as represented by the United States Atomic Energy Commission
No Drawing. Filed Dec. 31, 1958, Ser. No. 784,073
12 Claims. (Cl. 117—46)

The present invention relates to an improved graphite or carbon product and more particularly to a graphite or carbon product which is extremely resistant to corrosion and erosion, and also relatively impervious to the passage of gases and vapors, and to a method of making the same.

Graphite and carbon are used in nuclear reactors and the like for structural members, and in the containment of nuclear fuels. Although graphite and carbon are normally quite permeable or porous, it is extremely important in some of such applications that they be rendered as impervious as possible to the passage of vapors and gases such as vaporous fission products and the like.

The following flow sheet illustrates the process:

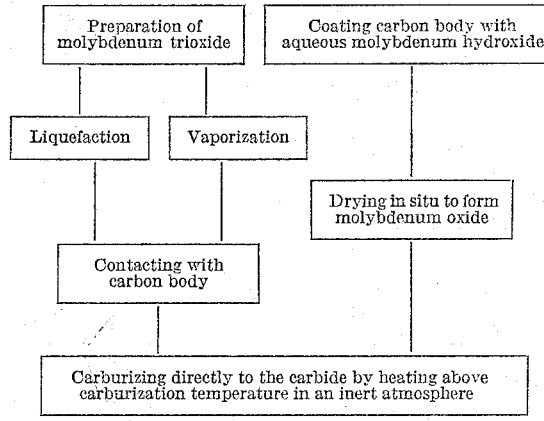

Various attempts have been made to produce dense, relatively impervious graphite. However, despite the fact that carbon and graphite have been made in extremely dense forms, such forms usually permit the passage of small amounts of gases and vapors, and therefore are not entirely satisfactory.

Another problem has arisen in connection with the use of carbon and graphite in nuclear reactors. Graphite has a tendency to become corroded and eroded under the operating conditions within the reactor, especially when the reactor core is operated at extremely high temperatures. The problem of corrosion and erosion is especially important in reactors which are designed to have a high "burn-up" period, i.e., to utilize a high proportion of the energy in the fuel. In such reactors the life of the fuel element may extend over a period of several years and, under these conditions, the failure of structural carbon elements may occur due to the deterioration which is effected by corrosion and erosion.

Accordingly, it is the principal object of the invention to provide a carbon element having increased resistance to corrosion and erosion and having a lower permeability to the passage of gases and vapors than the known carbon bodies.

Other objects and advantages of the invention will become apparent from the following description of the invention. It will be understood that the term carbon in the description covers carbon in any of its forms, e.g., amorphous carbon or graphite, carbon in its crystalline form.

It has been found that the permeability of carbon to gases and vapors, particularly volatilized fission products, can be decreased and at the same time the resistance of the carbon to corrosion and erosion, particularly at high temperatures of the order of 1000° C. to 2000° C., can be increased by forming in situ on a face or faces of the carbon body a carbide of molybdenum. Preferably, the region to be coated should extend inwardly from the face of the carbon body so that the carbide is diffused throughout the outer region of the carbon body and is integral with the remainder of the carbon body.

The molybdenum carbide formed on one or more surfaces of the carbon body has certain additional advantages. In this connection, molybdenum carbide is structurally strong at high temperatures, remaining stable on and within the carbon body. Moreover, molybdenum carbide has about the same coefficient of expansion as graphite. Accordingly, in utilizing graphite bodies impermeabilized with the molybdenum carbide, there is little danger of fracture due to differential expansion during heating and cooling operations, so that the impermeabilized graphite bodies are more durable and have a wider field of application.

In accordance with the method of the present invention, the surface or surfaces of the carbon body to be treated are contacted with, that is, coated with molybdenum oxide. The prefererd form of the molybdenum oxide is the trioxide, of the formula $MoO_3$. The resulting impermeabilized carbon body preferably has an outer layer of molybdenum carbide diffused with and intimately bonded to the carbon of the body for maximal results, rather than just a surface coating of the carbide.

In carrying out the method of the present invention, the molybdenum trioxide can be applied to the surface or surfaces of the carbon body in either a single or a multiple coating operation, with or without intervening carburizing treatments. The application and carburization of the molybdenum trioxide requires certain special techniques because molybdenum trioxide sublimes below the carburization temperature. In this connection, molybdenum trioxide begins to sublime at temperatures as low as 650° C. to 700° C. at atmospheric pressure, and its melting point is 795° C.

One suitable technique for carrying out the method of the present invention includes vaporizing molybdenum trioxide, for example, by heating the molybdenum trioxide to a temperature in excess of about 650° C. in a chamber in an inert atmosphere, that is, in an atmosphere of argon, helium, or similar inert gas. The carbon surface to be treated is then brought into contact with the vaporized molybdenum trioxide.

The temperature of the vaporized molybdenum trioxide, and also that of the carbon body, may be varied depending upon the exact effect which is to be obtained. In this connection, for example, the vaporized molybdenum trioxide can be maintained below carburization temperature, that is, below about 800°. The carbon body can be at carburization temperature, i.e., over about 800° C. and preferably between about 1500 and 1900° C., so that as the molybdenum trioxide vapor contacts and diffuses into the carbon body it is rapidly converted in situ to molybdenum carbide, utilizing the carbon of the carbon body. Accordingly, the desired impermeabilization by formation of molybdenum carbide can be obtained directly on and in the carbon body. The treated carbon body has increased durability and resistance to corrosion and erosion, particularly at high temperatures.

As an example of this technique, molybdenum trioxide may be heated to 750° C. to vaporize the same, and the vapor is then conducted into contact with a carbon body, for example, through a hollow carbon tube preheated to 1600° C. Carburization will occur relatively rapidly.

Molybdenum carbide is formed on the surface and diffused into the surface of the carbon tube. The treated tube is then allowed to cool to ambient temperature and is ready for use.

If desired, the carbon body may initially be substantially cooler than the temperature at which the molybdenum trioxide is vaporized so that the molybdenum trioxide will condense on and coat the carbon body. Molybdenum trioxide may be vaporized at a temperature of, for example, 700° C. and the carbon body may be maintained at a relatively cool temperature, for example, 100° C. to 650° C. Care should be taken to avoid excessive thermal shock caused by too wide a variation between the temperature of the carbon body and that of the vapor. Of course, the permissible differential temperature will depend upon the shape and cross section of the object being coated.

Carburization can then be carried out by increasing the temperature of the carbon body to a suitable temperature of, for example, 1700° C., while maintaining the carbon body in the inert atmosphere of helium or other suitable gas under a pressure of several atmospheres, e.g., 50 to 100 pounds per square inch, to prevent the molybdenum trioxide coating from subliming off the coated object.

The molybdenum trioxide on the carbon body is reduced and converted in situ to molybdenum carbide.

Vaporized molybdenum trioxide need not be the starting material in carrying out the coating step. In this connection, for example, molybdenum hydroxide, $$Mo(OH)_6$$

can be used. This material can be formed by reaction of ammonium hydroxide with molybdenum trioxide, and has the advantage of being water soluble so that an aqueous solution thereof can be applied to the carbon body, as by dipping, painting, spraying or the like. Such application assures a substantially uniform concentration of the molybdenum hydroxide over the coated area of the carbon body. This technique has the further advantage of affording a simple manner of providing a penetration of the carbon body with the carbide-forming material.

During heating of the dried coating to a carburizing temperature, the molybdenum hydroxide is converted to the desired molybdenum oxide and, upon carburizing, molybdenum carbide is formed in situ on and in the surface of the carbon body. In heating up the carbon body subsequent to the coating operation, an inert or reducing atmosphere is provided, preferably under pressure to prevent substantial sublimitation of the formed molybdenum trioxide above 650° C. As an example of this technique, a 5 percent by weight aqueous solution of molybdenum hydroxide, $Mo(OH)_6$, may be sprayed onto the exposed surfaces of a graphite tube, after which the graphite tube is heated to 1800° C. in a closed retort in a helium atmosphere at a pressure of 100 pounds per square inch, and maintained at that temperature until carburization is completed. The tube is then allowed to cool to room temperature and is removed from the retort.

Another suitable technique comprises melting molybdenum trioxide under pressure of an inert atmosphere and coating therewith, in an inert or reducing atmosphere, a carbon body suitably preheated to avoid thermal shock, and preferably which has also been subjected to evacuation to remove entrapped gases. The molybdenum trioxide may then be solidified in situ and the carburization step later carried out as previously described, under increased pressure in an inert or reducing atmosphere. As an example, molybdenum trioxide is melted under a pressure of 100 pounds per square inch of helium at 800° C. and a graphite plate is dipped therein while such inert atmosphere, pressure and temperature conditions are maintained, after which the sheet is transferred to a chamber pressurized with helium at 100 pounds per square inch and the plate is carburized at 1800° C.

The previously described evacuation of the carbon body can also be employed in connection with the application of the molybdenum oxide coating to the carbon plate in the form of a vapor. As an example, a carbon plate is placed in a chamber containing molybdenum trioxide, after which the chamber is evacuated to remove entrapped air. Thereafter, the molybdenum trioxide is vaporized by heating it to 800° C., the vapor then permeating the pores of the carbon plate. Thereafter, the temperature of the plate is raised to 1700° C. under a pressure of 100 pounds per square inch of helium to effect the formation of molybdenum carbide in and on the plate.

Whatever the technique employed for carrying out the method of the present invention, the carbon or graphite body should, in accordance with the present invention, be suitably coated and impregnated with molybdenum carbide formed in situ. The improved durability and decreased permeability of the carbon products to vapors and gases increase the utility of the carbon products, particularly in connection with their use in nuclear reactors and the like.

Moreover, the carbon products which have been treated in accordance with this invention are resistant to surface cracking due to the fact that the thermal coefficients of expansion of the molybdenum carbide and carbon are substantially the same. This makes possible multiple coatings and impregnations so as to insure a maximum decrease in the permeability of the body.

Various modifications of the techniques described in the foregoing can be utilized for carrying out the method of the present invention. Such modifications in the method of the present invention, in the steps thereof, the materials and equipment for carrying out the method, and in the products thereof as are within the skill of those versed in the art are contemplated as being within the scope of the present invention.

Various features of the present invention which are believed to be new are set forth in the appended claims. In the claims, the term carbon should be construed to cover carbon in its various forms, e.g., amorphous carbon, or graphite, carbon in its crystalline form.

I claim:

1. The method of treating a carbon body which comprises the steps of coating a carbon body with molybdenum oxide below the carburization temperature and carburizing said molybdenum oxide directly to the carbide in situ on said carbon body in presence of inert atmosphere whereby molybdenum carbide is formed in situ on and within said carbon body, whereby said carbon body is rendered less permeable to the flow of gases therethrough and has increased resistance to corrosion and erosion.

2. The method of treating a carbon body which comprises the steps of contacting a carbon body with molybdenum trioxide vapor at a temperature below the carburization point and carburizing said molybdenum trioxide vapor directly to the carbide in situ in the presence of an inert atmosphere on and within said carbon body whereby molybdenum carbide is formed in situ on said carbon body whereby said carbon body is rendered less permeable to the flow of gases therethrough and has increased resistance to corrosion and erosion.

3. The method of treating a carbon body which comprises the steps of contacting a carbon body heated to a carburizing temperature with molybdenum trioxide vapor disposed in an inert atmosphere and maintained at a temperature below the carburization point, to carburize said molybdenum trioxide vapor in situ directly to the carbide on and within said carbon body whereby said carbon body is rendered less permeable to the flow of gases therethrough and has increased resistance to corrosion and erosion.

4. The method of treating a carbon body which comprises the steps of contacting a carbon body heated to a temperature of over 800° C. with molybdenum trioxide vapor in an inert atmosphere, to carburize said molybdenum trioxide vapor in situ directly to the carbide on and within said carbon body whereby said carbon body is rendered less permeable to the flow of gases therethrough and has increased resistance to corrosion and erosion.

5. The method of treating a carbon body which comprises the steps of contacting a carbon body heated to a temperature of over 1500° C. with molybdenum trioxide vapor in an inert atmosphere having a temperature below the carburization temperature of that molybdenum trioxide, to carburize said molybdenum trioxide vapor in situ directly to the carbide on and within said carbon body whereby said carbon body is rendered less permeable to the flow of gases therethrough and has increased resistance to corrosion and erosion.

6. The method of treating a carbon body which comprises the steps of coating a carbon body with molybdenum trioxide by contacting a carbon body held at a temperature below the condensation temperature of molybdenum trioxide vapor with vaporized molybdenum trioxide and carburizing said molybdenum trioxide in situ in an inert atmosphere on said carbon body by raising said body to a carburizing temperature whereby molybdenum carbide is formed in situ directly to the carbide on and within said carbon body, and said carbon body is rendered less permeable to the flow of gases therethrough and has increased resistance to corrosion and erosion.

7. The method of treating a carbon body which comprises the steps of coating a carbon body with molybdenum trioxide by contacting a carbon body held at a temperature below the condensation temperature of molybdenum trioxide vapor with vaporized molybdenum trioxide and carburizing said molybdenum trioxide in situ in the presence of an inert atmosphere on and within said carbon body by raising said body to a temperature of about 1500° C. whereby molybdenum carbide is formed in situ on said carbon body, and said carbon body is rendered less permeable to the flow of gases therethrough and has increased resistance to corrosion and erosion.

8. The method of treating a carbon body which comprises the steps of coating a carbon body with molybdenum trioxide by contacting a carbon body held at a temperature below the condensation temperature of molybdenum trioxide vapor with vaporized molybdenum trioxide and carburizing said molybdenum trioxide in situ on and within said carbon body by raising said body to a temperature of above 1500° C. in an inert atmosphere under pressure whereby sublimation of said molybdenum trioxide is inhibited prior to the formation of the carbide, and whereby molybdenum carbide is formed in situ directly to the carbide on and within said carbon body and said carbon body is rendered less permeable to the flow of gases therethrough and has increased resistance to corrosion and erosion.

9. The method of treating a carbon body which comprises the steps of coating a carbon body with heated, liquid molybdenum trioxide and carburizing said molybdenum trioxide in situ in an inert atmosphere directly to the carbide on and within said carbon body at a carburizing temperature whereby molybdenum carbide is formed in situ on said carbon body, and said carbon body is rendered less permeable to the flow of gases therethrough and has increased resistance to corrosion and erosion.

10. The method of treating a carbon body which comprises the steps of coating a carbon body with heated, liquid molybdenum trioxide in an inert atmosphere under pressure and carburizing said molybdenum trioxide in situ directly to the carbide on and within said carbon body at a temperature of over about 1500° C. in an inert atmosphere under pressure whereby molybdenum carbide is formed in situ on said carbon body, and said carbon body is rendered less permeable to the flow of gases therethrough and has increased resistance to corrosion and erosion.

11. The method of treating a carbon body which comprises the steps of removing entrapped gases from a carbon body by evacuation, coating said body with molybdenum trioxide, and carburizing said molybdenum trioxide in situ in an inert atmosphere directly to the carbide on and within said carbon body at a carburizing temperature whereby molybdenum carbide is formed in situ on said carbon body and said carbon body is rendered less permeable to the flow of gases therethrough and has increased resistance to corrosion and erosion.

12. The method of treating a carbon body which comprises the steps of coating a carbon body with molybdenum oxide by coating said carbon body with an aqueous solution containing molybdenum hydroxide, drying said carbon body and heating said carbon body to form molybdenum oxide in situ and carburizing said molybdenum oxide in situ directly to the carbide on and within said carbon body at a carburizing temperature in an inert atmosphere under pressure whereby molybdenum carbide is formed in situ on said carbon body, and said carbon body is rendered less permeable to the flow of gases therethrough and has increased resistance to corrosion and erosion.

References Cited in the file of this patent

UNITED STATES PATENTS

| | | |
|---|---|---|
| 404,463 | Bottom | June 4, 1889 |
| 2,282,098 | Taylor | May 5, 1942 |
| 2,597,963 | Winter | May 27, 1952 |
| 2,719,094 | Clough et al. | Sept. 27, 1955 |
| 2,876,139 | Flowers | Mar. 3, 1959 |
| 2,930,106 | Wrotnowski | Mar. 29, 1960 |

FOREIGN PATENTS

| | | |
|---|---|---|
| 589,977 | Great Britain | July 4, 1947 |